United States Patent
Chen et al.

(10) Patent No.: US 9,495,217 B2
(45) Date of Patent: *Nov. 15, 2016

(54) EMPIRICAL DETERMINATION OF ADAPTER AFFINITY IN HIGH PERFORMANCE COMPUTING (HPC) ENVIRONMENT

(71) Applicant: International Business Machines Corporation, Armonk, NY (US)

(72) Inventors: Wen C. Chen, Rhinebeck, NY (US); Tsai-Yang Jea, Poughkeepsie, NY (US); Wiliam P. LePera, Poughkeepsie, NY (US); Hung Q. Thai, Bronx, NY (US); Hanhong Xue, Wappingers Falls, NY (US); Zhi Zhang, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/445,546

(22) Filed: Jul. 29, 2014

(65) Prior Publication Data

US 2016/0034312 A1 Feb. 4, 2016

(51) Int. Cl.
*G06F 9/455* (2006.01)
*G06F 9/50* (2006.01)
*G06F 9/46* (2006.01)
*G06F 9/52* (2006.01)
*G06F 11/34* (2006.01)

(52) U.S. Cl.
CPC ............ *G06F 9/5033* (2013.01); *G06F 9/461* (2013.01); *G06F 9/528* (2013.01); *G06F 11/3433* (2013.01); *G06F 2209/501* (2013.01)

(58) Field of Classification Search
CPC .... G06F 21/85; G06F 3/061; G06F 11/0745; G06F 11/3017; G06F 2212/206; G06F 11/0724; G06F 2009/45579; G06F 9/5027
See application file for complete search history.

(56) References Cited

U.S. PATENT DOCUMENTS

| | | | |
|---|---|---|---|
| 6,295,575 B1 * | 9/2001 | Blumenau | G06F 3/0622 711/153 |
| 6,728,258 B1 * | 4/2004 | Okada | G06F 15/17375 370/390 |
| 6,826,753 B1 | 11/2004 | Dageville et al. | |
| 7,174,381 B2 * | 2/2007 | Gulko | G06F 8/451 709/226 |
| 8,260,925 B2 | 9/2012 | Chen et al. | |
| 8,683,022 B2 * | 3/2014 | Nelson | H04L 12/2697 709/220 |
| 2007/0073993 A1 | 3/2007 | Allen et al. | |

(Continued)

OTHER PUBLICATIONS

David Brelsford, Partitioned Parallel Job Scheduling for Extreme Scale Computing; 2013 springer; pp. 157-177; <http://link.springer.com/chapter/10.1007/978-3-642-35867-8_9>.*

(Continued)

*Primary Examiner* — Thuy Dao
*Assistant Examiner* — Cuong V Luu
(74) *Attorney, Agent, or Firm* — Middleton Reutlinger (57) ABSTRACT

A method, apparatus and program product utilize an empirical approach to determine the locations of one or more IO adapters in an HPC environment. Performance tests may be run using a plurality of candidate mappings that map IO adapters to various locations in the HPC environment, and based upon the results of such testing, speculative adapter affinity information may be generated that assigns one or more IO adapters to one or more locations to optimize adapter affinity performance for subsequently-executed tasks.

11 Claims, 4 Drawing Sheets

(56) References Cited

U.S. PATENT DOCUMENTS

| | | | | |
|---|---|---|---|---|
| 2008/0141251 | A1* | 6/2008 | Arndt | G06F 9/5088 718/102 |
| 2008/0189433 | A1* | 8/2008 | Nelson | H04L 12/2697 709/240 |
| 2008/0209243 | A1* | 8/2008 | Ghiasi | G06F 1/3203 713/320 |
| 2010/0153964 | A1* | 6/2010 | Thai et al. | G06F 9/50 718/105 |
| 2010/0275213 | A1* | 10/2010 | Sakai | G06F 9/5033 718/104 |
| 2011/0138396 | A1 | 6/2011 | Chen et al. | |
| 2011/0154302 | A1 | 6/2011 | Balko et al. | |
| 2011/0265095 | A1* | 10/2011 | Cardona | G06F 9/505 718/105 |
| 2012/0311299 | A1* | 12/2012 | Blumrich | G06F 9/52 712/16 |
| 2014/0026111 | A1* | 1/2014 | Stitt | G06F 9/5027 717/101 |
| 2015/0248312 | A1 | 9/2015 | Brochard et al. | |
| 2015/0317190 | A1* | 11/2015 | Ebcioglu | G06F 17/5045 718/106 |
| 2016/0034312 | A1* | 2/2016 | Chen | G06F 9/5033 718/104 |

OTHER PUBLICATIONS

Volodymyr V. Kindratenko et al.; GPU Clusters for High-Performance Computing; 2009 IEEE; 8 pages; <http://ieeexplore.ieee.org/stamp/stamp.jsp?tp=&arnumber=5289128>.*

Mahsan Rofouei et al.; Energy-Aware High Performance Computing with Graphic Processing Units; 2008 usenix; 5 pages; <http://static.usenix.org/events/hotpower08/tech/full_papers/rofouei/rofouei.pdf>.*

Cyriel Minkenberg et al.; Trace-driven Co-simulation of High-Performance Computing Systems using OMNeT++; 2009 ACM; 8 pages; <http://dl.acm.org/citation.cfm?id=1537697>.*

Nathan Regola et al.; Recommendations for Virtualization Technologies in High Performance Computing ; 2010 IEEE; pp. 409-416; <http://ieeexplore.ieee.org/stamp/stamp.jsp?tp=&arnumber=5708479>.*

Viktor Mauch et al.; Future Generation Computer Systems; 2013 Elsevier; pp. 1408-1416; <http://www.sciencedirect.com/science/article/pii/S0167739X12000647>.*

Nidhi Aggarwal et al.; Configurable Isolation Building High Availability Systems with Commodity Multi-Core Processors; 2007 ACM; pp. 470-481; <http://dl.acm.org/citation.cfm?id=1250720>.*

William Gropp et al.; A high-performance, portable implementation of the MPI message passing interface standard; 1996 Elsevier; pp. 789-828; <http://www.sciencedirect.com/science/article/pii/0167819196000245>.*

Ra jkumar Buyya et al.; High Performance Cluster Computing Architectures and Systems vol. 1; 1999 Gridubs.org; 24 pages; <http://www.cloudbus.org/~raj/cluster/v1toc.pdf>.*

Viktor Mauch et al.; High performance cloud computing; 2013 Elsevier; pp. 1408-1413; <http://www.sciencedirect.com/science/article/pii/S0167739X12000647>.*

Hemant Kanakia et al.; The VMP Network Adapter Board (NAB) High-Performance Network Communication for Multiprocessors; 1988 ACM; pp. 175-187; <http://dl.acm.org/citation.cfm?id=52343>.*

Wolfgang E. Denzel et al.; A Framework for End-to-End Simulation of High-performance Computing Systems; 2016 Simulation; pp. 331-350; <http://sim.sagepub.com/content/86/5-6/331.full.pdf+html>.*

Randy H. Katz et al.; Disk System Architectures for High Performance Computing; 1950 Technical Journal; 42 pages; <http://www.eecs.berkeley.edu/Pubs/TechRpts/1989/CSD-89-497.pdf>.*

Chen, Wen C., et al. "Empirical Determination of Adapter Affinity in High Performance Computing (HPC) Environment," U.S. Appl. No. 14/530,095, Oct. 31, 2014.

List of IBM Patents or Patent Applications Treated as Related.

Revised List of IBM Patents or Patent Applications Treated as Related.

David Brelsford et al., "Partitioned Parallel Job Scheduling for Extreme Scale Computing"; IBM Corporation; IBM Systems and Technoloty Group; IBM T. J. Watson Research Center; 2012-2013.

Javier Bueno et al., "Productive Programming of GPU Clusters with OmpSs"; 2012 IEEE 26th International Symposium on Parallel and Distributed Processing Symposium, pp. 557-568; IEEE Computer Society; 2012.

Steve Nasypany, "Optimizing for POWER7 & AIX What's New"; IBM Corporation; IBM Advanced Technical Skills; nasypany@us.ibm.com; 2012.

Marc Snir; The Future of Supercomputing; 2014 ACM; pp. 261-262; <http://dl.acm.org/citation.cfm?id=2616585&CFID=634144449&CFTOKEN=41028965>.

Songqing Yue; Program Transformation Techniques Applied to Languages Used in High Performance Computing; 2013 ACM; pp. 49-51; <http://dl.acm.org/citation.cfm?id=2508081&CFID=634144449&CFTOKEN=41028965>.

L. A. Drummond et al.; An Overview of the Advanced CompuTational Software (ACTS) Collection; 2005 ACM; pp. 282-301; <http://dl.acm.org/citation.cfm?id=1089016&CFID=634144449&CFTOKEN=41028965>.

Luiz M.R. Gadelha Jr; Exploring Provenance in High Performance Scientific Computing; 2011 ACM; pp. 17-20; <http://dl.acm.org/citation.cfm?id=2125643&CFID=634144449&CFTOKEN=41028965>.

Richard M. Yoo et al.; Performance Evaluation of Intel Transactional Synchronization Extensions for High-Performance computer, 2013 ACM; 11 pages; <http://dl.acm.org/citation.cfm?id=2503232&CFID=634144449&CFTOKEN=41028965>.

X. Sharon Hu et al.; Hardware Software Co-Design for High Performance Computing Challenges and Opportunities; 2010 ACM; pp. 63-64; <http://dl.acm.org/citation.cfm?id=1878975&CFID=634144449&CFTOKEN=41028965>.

U.S. Patent and Trademark Office, Notice of Allowance issued in related U.S. Appl. No. 14/530,095 dated Jul. 25, 2016.

U.S. Patent and Trademark Office, Office Action issued in related U.S. Appl. No. 14/530,095 dated Dec. 24, 2015.

U.S. Patent and Trademark Office, Notice of Allowance issued in related U.S. Appl. No. 14/530,095 dated Apr. 13, 2016.

Li-jie Jin et al.; From Metacomputing to Metabusiness Processing; 2000 IEEE; pp. 99-108; <http://ieeexplore.ieee.org/stamp/stamp.jsp?tp=&arnumber=8889010>.

John R. Wemsing; Elastic Computing A Framework for Transparent, Portable, and Adaptive Multi-core Heterogeneous Computing 2010 ACM; pp. 115-124; <http://dl.acm.org/citation.cfm?id=1755906>.

Hemant Kanakia; The VMP Network Adaptor Board (NAB) High-Performance Network Communication for Multiprocessors; 1988 ACM; pp. 175-187; <http://dl.acm.org/citation.cfm?id=52343>.

Douglas C. Schmid et al.; A High Performance End System Architecture for Real Time COBRA; 1997 IEEE; pp. 72-77; <http://ieeexplore.ieee.org/stamp/stamp.jsp?tp=&arnumber=565659.

R. Rajamony et al.; PERCS TheIBM POWER7-IH high-performance computing system; 2011 IEEE; 12 pages; <http://ieeexplore.ieee.org/stamp/stamp.jsp?p=&arnumber=5739087>.

Gang Cheng et al.; An Interactive Remote Visualization Environment for an Electromagnetic Scattering Simulation on a High Performance Computing System; 1993 ACM; pp. 317-326; <http://dl.acm.org/citation.cfm?id=169743>.

* cited by examiner

EMPIRICAL DETERMINATION OF ADAPTER AFFINITY IN HIGH PERFORMANCE COMPUTING (HPC) ENVIRONMENT

FIELD OF THE INVENTION

The invention is generally related to computers and computer software, and in particular, to high performance computing (HPC) environments.

BACKGROUND OF THE INVENTION

Computing technology has advanced at a remarkable pace, with each subsequent generation of computing system increasing in performance, functionality, and storage capacity, often at reduced cost. However, despite these advances, many scientific and business applications still demand massive computing power, which can only be met by extremely high performance computing (HPC) systems. One particular type of computing system architecture that is often used in high performance applications is a parallel processing computing system.

Generally, a parallel processing computing system comprises a plurality of physical computing nodes and is configured with an HPC application environment, e.g., including a runtime environment that supports the execution of a parallel application across multiple physical computing nodes. Some parallel processing computing systems, which may also be referred to as massively parallel processing computing systems, may have hundreds or thousands of individual physical computing nodes, and provide supercomputer class performance. Each physical computing node is typically of relatively modest computing power and generally includes one or more processors and a set of dedicated memory devices, and is configured with an operating system instance (OSI), as well as components defining a software stack for the runtime environment. To execute a parallel application, a cluster is generally created consisting of physical computing nodes, and one or more parallel tasks are executed within an OSI in each physical computing node and using the runtime environment such that tasks may be executed in parallel across all physical computing nodes in the cluster.

Performance in parallel processing computing systems can be dependent upon the communication costs associated with communicating data between the components in such systems. Accessing a memory directly coupled to a processor in one physical computing node, for example, may be one or more orders of magnitude faster than accessing a memory on different physical computing node. In addition, retaining the data within a processor and/or directly coupled memory when a processor switches between different tasks can avoid having to reload the data. Accordingly, organizing the tasks executed in a parallel processing computing system to localize operations and data and minimize the latency associated with communicating data between components can have an appreciable impact on performance. For example, tasks can be assigned or bound to particular processors or physical nodes using a concept commonly referred to as affinity such that the tasks will be scheduled for execution if at all possible on the processors or physical nodes to which such tasks have an affinity.

Likewise, performance can be impacted by the relationship between tasks and other types of components in a parallel processing computing system. As one example, parallel processing computing systems may support multiple input/output (IO) adapters, e.g., network adapters for communication of data over a network. Furthermore, as with distributed processors and memories through the multiple physical computing nodes of a parallel processing computing system, distributing network adapters in this manner may result in variations in latency and bandwidth for tasks accessing such network adapters based upon where the tasks are executed relative to where the network adapters are located. Accordingly, tasks may also be assigned or bound to particular network adapters in a system based upon adapter affinity.

In some parallel processing computing systems, however, the physical locations of network and other IO adapters resident in such systems may not be available for task scheduling purposes. As such, in such systems it may not be possible to schedule tasks in a manner that optimizes or at least considers adapter performance.

SUMMARY OF THE INVENTION

The invention addresses these and other problems associated with the prior art by providing a method, apparatus and program product that utilize an empirical approach to determine the locations of one or more IO adapters in an HPC environment. Performance tests may be run using a plurality of candidate mappings that map IO adapters to various locations in the HPC environment, and based upon the results of such testing, speculative adapter affinity information may be generated that assigns one or more IO adapters to one or more locations to optimize adapter affinity performance for subsequently-executed tasks.

Therefore, consistent with one aspect of the invention, adapter affinity may be determined in a high performance computing (HPC) environment of the type including a plurality of distributed computing components defining a plurality of locations and a plurality of input/output (IO) adapters, with each distributed computing component including at least one processing element, and with each IO adapter coupled to a distributed computing component among the plurality of distributed computing components. For each of a plurality of candidate mappings that speculatively map at least one IO adapter to at least one location among the plurality of locations, a performance test may be run for a task executed by a processing element in a distributed computing component at a first location among the plurality of locations, where the plurality of candidate mappings includes first and second candidate mappings, where the first candidate mapping maps a first IO adapter among the plurality of IO adapters to the first location, and the second candidate mapping maps a second IO adapter among the plurality of IO adapters to the first location, and where running the performance test respectively generates first and second test results for the first and second candidate mappings. Speculative adapter affinity information may be generated that assigns at least one IO adapter to at least one location among the plurality of locations based upon the performance test run for each of the plurality of candidate mappings, including assigning the first IO adapter to the first location based upon a comparison of the first and second test results for the first and second candidate mappings.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Embodiments consistent with the invention utilize an empirical approach to determine the locations of one or more IO adapters in an HPC environment. Performance tests may be run using a plurality of candidate mappings that map IO adapters to various locations in the HPC environment, and based upon the results of such testing, speculative adapter affinity information may be generated that assigns one or more IO adapters to one or more locations to optimize adapter affinity performance for subsequently-executed tasks.

In this regard, an HPC environment consistent with the invention may be considered to include a hardware and/or software environment suitable for hosting an HPC application, generally implemented using a plurality of parallel tasks. From a hardware perspective, an HPC environment includes a plurality of distributing computing components, organized in one or more hierarchical levels, and supporting the concurrent execution of a plurality of hardware threads of execution. In many production environments, an HPC application may be implemented using hundreds, thousands, or more parallel tasks running on hundreds, thousands, or more hardware threads of execution.

Numerous variations and modifications will be apparent to one of ordinary skill in the art, as will become apparent from the description below. Therefore, the invention is not limited to the specific implementations discussed herein.

Hardware and Software Environment

Figure 1:
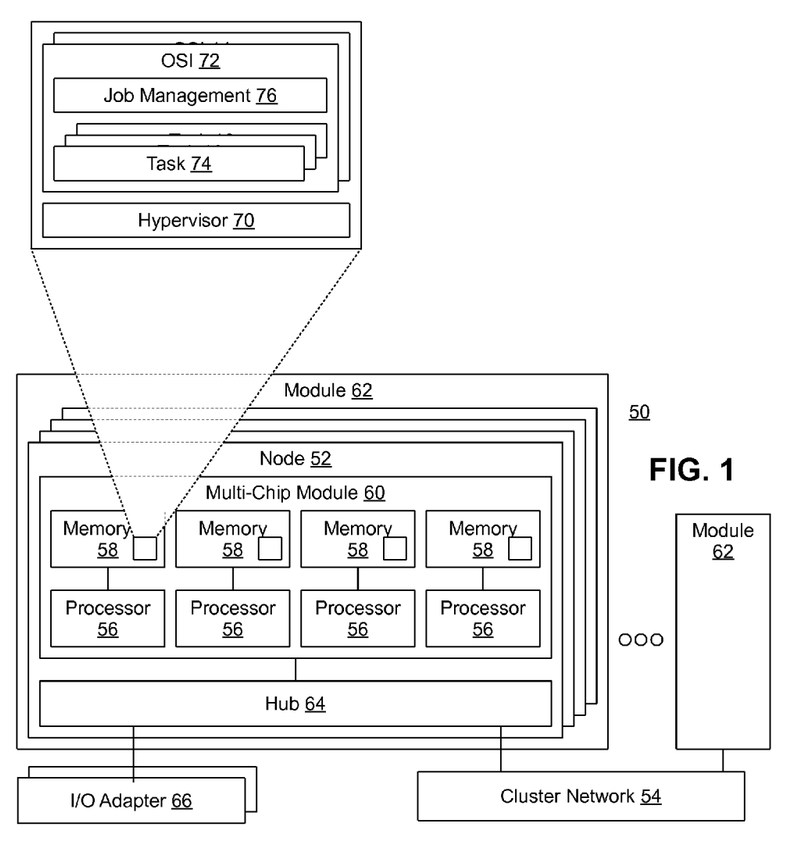
FIG. 1 is a block diagram of an example hardware and software environment suitable for empirically determining adapter affinity in a manner consistent with the invention.

Turning to the Drawings, wherein like parts denote like numbers throughout the several views, FIG. 1 illustrates the principal hardware and software components in an apparatus 50 capable of implementing an HPC environment consistent with the invention. Apparatus 50 is illustrated as an HPC system incorporating a plurality of physical computing nodes 52 coupled to one another over a cluster network 54, and including a plurality of processors 56 coupled to a plurality of memory devices 58 representing the computational and memory resources of the HPC system.

Apparatus 50 may be implemented using any of a number of different architectures suitable for executing HPC applications, e.g., a supercomputer architecture. For example, in one embodiment, apparatus 50 may be implemented as a Power7 IH-based system available from International Business Machines Corporation. In this implementation, processors 56 and memory devices 58 may be disposed on multi-chip modules 60, e.g., quad chip modules (QCM's), which in turn may be disposed within a physical computing node 52 along with a hub chip 64 that provides access to one or more input/output (I/O) adapters 66, which may be used to access network, storage and other external resources. Multiple (e.g., eight) physical computing nodes 52 (also referred to as octants) may be organized together into modules 62, e.g., rack modules or drawers, and physical computing nodes may be further organized into supernodes, cabinets, data centers, etc. It will be appreciated that other architectures suitable for executing HPC applications may be used, e.g., any of the Blue Gene/L, Blue Gene/P, and Blue Gene/Q architectures available from International Business Machines Corporation, among others. Therefore, the invention is not limited to use with the Power7 IH architecture disclosed herein.

Each processor 56 may be implemented as a single or multi-threaded processor and/or as a single or multi-core processor, while each memory 58 may be considered to include one or more levels of memory devices, e.g., a DRAM-based main storage, as well as one or more levels of data, instruction and/or combination caches, with certain caches either serving individual processors or multiple processors as is well known in the art. In addition, the memory of apparatus 50 may be considered to include memory storage physically located elsewhere in apparatus 50, e.g., any cache memory in a processor, as well as any storage capacity used as a virtual memory, e.g., as stored on a mass storage device or on another computer coupled to apparatus 50.

Apparatus 50 operates under the control of one or more kernels, hypervisors, operating systems, etc., and executes or otherwise relies upon various computer software applications, components, programs, objects, modules, data structures, etc., as will be described in greater detail below. Moreover, various applications, components, programs, objects, modules, etc. may also execute on one or more processors in another computer coupled to apparatus 50 via network, e.g., in a distributed or client-server computing environment, whereby the processing required to implement the functions of a computer program may be allocated to multiple computers over a network.

For example, FIG. 1 illustrates various software components 70-76 forming a software stack that may be resident within the memories 58 in an MCM 60. A hypervisor 70 may host one or more operating system instances 72, within which may reside one or more tasks 74. Additional components, e.g., a job management component 76, parallel operating environment (POE) or other load balancing functionality, etc., may further support the execution of parallel tasks and jobs in apparatus 50. It will be appreciated that additional and/or alternate components may be supported in a software stack for an HPC environment, and that components may be replicated and/or distributed among the various memories, MCM's, nodes, etc. in apparatus 50. In the illustrated embodiment, for example, an IBM Power HPC software stack available from International Business Machines Corporation may be used, although the invention is not so limited.

It will be appreciated that the present invention may be a system, a method, and/or a computer program product. The computer program product may include a computer readable storage medium (or media) having computer readable program instructions thereon for causing one or more processors to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the drawings illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition, computer readable program instructions, of which one or more may collectively be referred to herein as "program code," may be identified herein based upon the application within which such instructions are implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the example environment illustrated in FIG. 1 is not intended to limit the present invention. Indeed, those skilled in the art will recognize that other alternative hardware and/or software environments may be used without departing from the scope of the invention.

Empirical Determination of Adapter Affinity in HPC Environment

Embodiments consistent with the invention are directed in part to an empirical approach for determining adapter affinity in an HPC environment, e.g., in a parallel processing computing system incorporating a plurality of input/output (IO) adapters such as network adapters, storage adapters, Host Channel Adapters (HCA's), etc. Embodiments consistent with the invention, in particular, determine adapter affinity information using an empirical approach to attempt to make a best guess as to which distributed computing component among a plurality of computing components an IO adapter is coupled using performance resulting from one or more performance tests or experiments. The information collected may then be used later as an input to future jobs or tasks to improve performance when executing those jobs or tasks.

In the illustrated embodiment, for example, the HPC environment is a Power7-based HPC environment in which computing resources are organized in a multi-level hierarchy where one or more processing threads are implemented within one or more processing cores on one or more processors, and where one or more processors are disposed on one or more multi-chip modules (MCM's). MCM's in turn are organized into physical computing nodes (also referred to as octants), which in turn may be organized into modules, e.g., rack modules or drawers, supernodes, cabinets, data centers, etc. Through this organization, thousands or millions of individual parallel threads of execution may be supported for concurrent execution within an HPC environment.

Also, within a Power7-based HPC environment, individual MCM's incorporate one or more PCIe slots for interfacing with one or more IO adapters. In addition, the processors are packaged extremely close together with integrated caches and buses to enable fast data transfer and reliability, such that each MCM creates a substantially complete physical package for communications purposes. The parallel communication stack in such an environment also generally allows users to specify a parallel task to be scheduled to run on a set of processing elements, which within the context of the invention may be considered to be one or more hardware threads of execution on a processor or processing core, one or more processing cores on a processor, one or more processors on an MCM or spread across multiple or all MCM's in the HPC environment, or any combination of same. In the embodiment discussed hereinafter, for example, a processing element may be considered to be a hardware thread of execution. A task is also generally allocated with a fixed set of adapter resource units, identified by an IO adapter's ID and its logical port number, to send and receive data.

The concept of adapter affinity performance within the context of this environment is generally that when a task is scheduled on a particular processing element, e.g., a hardware thread of execution, processing core, processor, MCM, or other level of the hierarchy in a multi-level processing architecture, performance is optimized when the task selects or is otherwise assigned an adapter resource, allocated and available to the task, that is "closest" to the processing element(s) that it was scheduled to run on to achieve optimal bandwidth and latency performance due to the distance and capacity the data has to be moved.

To achieve this affinity performance at run time, however, a task generally must be aware of both which processing element(s) it is scheduled on and which adapter resource or resources are the "closest" to that processing element. In a Power7-based HPC environment, for example, an adapter resource is closest when it is plugged into the PCIe slot attached to the same MCM that contains the scheduled processing element(s).

Thus, more generally, selection of an adapter resource to optimize affinity performance for a task incorporates an awareness of the "locations" of both the processing element(s) upon which a task is scheduled for execution and the adapter resource(s) that may be utilized by the task. These locations may be considered within an overall hierarchy of a plurality of distributed computing components in an HPC environment. Thus, within the context of the aforementioned Power7-based HPC environment, the locations of interest from the perspective of adapter affinity performance within the hierarchy of distributed computing components are generally defined at the MCM level in the hierarchy, as it is to a particular MCM that an IO adapter is generally coupled that determines adapter affinity performance in this environment.

It will be appreciated, however, that in other HPC environments, the locations of interest may be defined at different levels in the hierarchy, e.g., at the processor level, the core level, the node level, the supernode level, the cabinet level, or any other level in a multi-level hierarchy where communication latency differs between distributed computing components and adapter resources in the same location and distributed computing components and adapter resources in different locations. Therefore, while the embodiments discussed hereinafter will refer to locations in terms of MCM's, the invention is not so limited.

In some HPC environments, e.g., Power6-based HPC environments, the information regarding which IO adapter is plugged into which MCM's slots, referred to herein as adapter affinity information, is known a priori by the HPC environment, is generally stored at startup or is known based upon the system architecture, and generally may be obtained by querying the component firmware. For the purposes of this disclosure, this type of adapter affinity information will be referred to hereinafter as "preconfigured" adapter affinity information.

This preconfigured adapter affinity information may be used for optimizing performance for parallel jobs that are allocated with multiple adapters for communications, as both the location of each IO adapter and the location of processing element is generally known. However, in other HPC environments, e.g., the aforementioned Power7-based HPC environment, this location information is not made available to jobs or tasks, or is otherwise not supported by the component firmware, and accordingly, adapter affinity performance may not be achieved programmatically through the use of queries to a component firmware or other layer in a software stack. Environments of this type are therefore referred to herein as environments where preconfigured adapter affinity information is unsupported, and it will be appreciated that such lack of support may be due to limitations of hardware, limitations of software, or some combination of same. For example, in the aforementioned Power7-based HPC environment, preconfigured adapter affinity information is generally not supported due to the fact that the IO adapters are plugged into PCIe slots.

In embodiments consistent with the invention, on the other hand, an empirical method is provided for a user to set environmental variables to specify a variety of mappings of IO adapters to an MCM in a best guess approach, and empirically run a benchmark test to obtain the performance for each mapping. The performance from the benchmark test may then be used in a best-effort approach to predict which adapter is plugged into which MCM. This information can then be saved, e.g., as a mapping that assigns IO adapters to specific locations (here, MCM's) so that future jobs or tasks can access the information to make choices in selecting which IO adapter to use for best performance.

Figure 2:
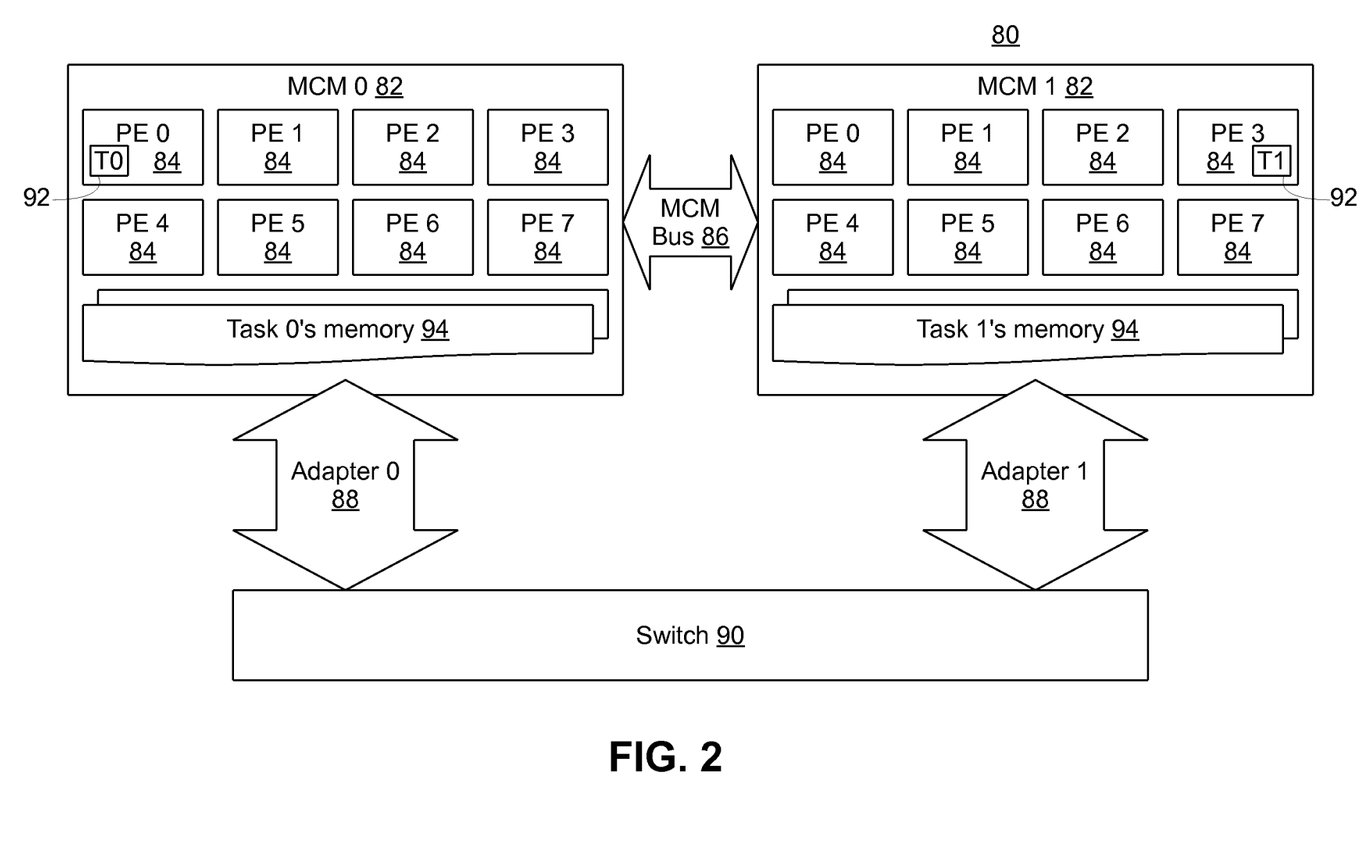
FIG. 2 is a block diagram of an example adapter affinity determination operation consistent with the invention.

FIG. 2 next illustrates an example HPC system or environment 80 including a plurality of MCM's 82, each with a plurality of PE's 84, and interconnected by a high speed MCM bus 86, which will be used hereinafter to further illustrate the herein-described empirical approach. Each MCM 82 is also coupled to an associated IO adapter 88 (here a network adapter), which is in turn coupled to a network switch 90. For the purposes of this example, two MCM's (MCM 0 and MCM 1) and two network adapters (adapter 0 and adapter 1), are shown, with each MCM includes eight PE's (PE 0 to PE 7), though it will be appreciated that any number of each of these components may be utilized in other embodiments.

Also illustrated in FIG. 2 are two example tasks 92, task 0 and task 1. Assume that task 0 is bound to PE 0 on MCM 0, and is allocated ports on both adapters 0 and 1. Also assume that task 0's allocated memory 94 is also resident in MCM 0. If task 0 is to send some data out to switch 90, it has been found that optimal performance is generally achieved when task 0 uses adapter 0 to send out data, instead of adapter 1, as the latter scenario would take a longer path to transfer task 0's data from MCM 0 to MCM 1 over MCM bus 86, and then out to adapter 1. It has been found, for example, that in a Power7-based HPC environment, the performance gain from selecting the closest adapter, i.e., the adapter that is on the same MCM as the MCM of a task's bound PE's, is about 5-10 percent, which may be highly beneficial for certain applications.

In other configurations, however, adapter 0 could be plugged into the PCIe slot attached to MCM 1, and adapter 1 could be plugged into the PCIe slot attached to MCM 0. Thus, if the information as into which PCIe slot each adapter is plugged is not available from the component firmware, as is generally the case in a Power7-based HPC environment, task 0 is not aware of which adapter is the closest one to send out data. Thus, if task 0 picks the adapter plugged into the PCIe slot attached to the other MCM, performance would generally degrade with the longer data transfer path.

However, by utilizing the empirical approach disclosed herein to map adapters to MCM's, this mapping information may be saved so that future jobs/tasks can retrieve the information and make appropriate choices in selecting which adapter to use for best performance. In addition, in many embodiments this discovery process may be run once at the completion of system configuration such that runtime empirical testing is not required for a particular job or task.

Figure 3:
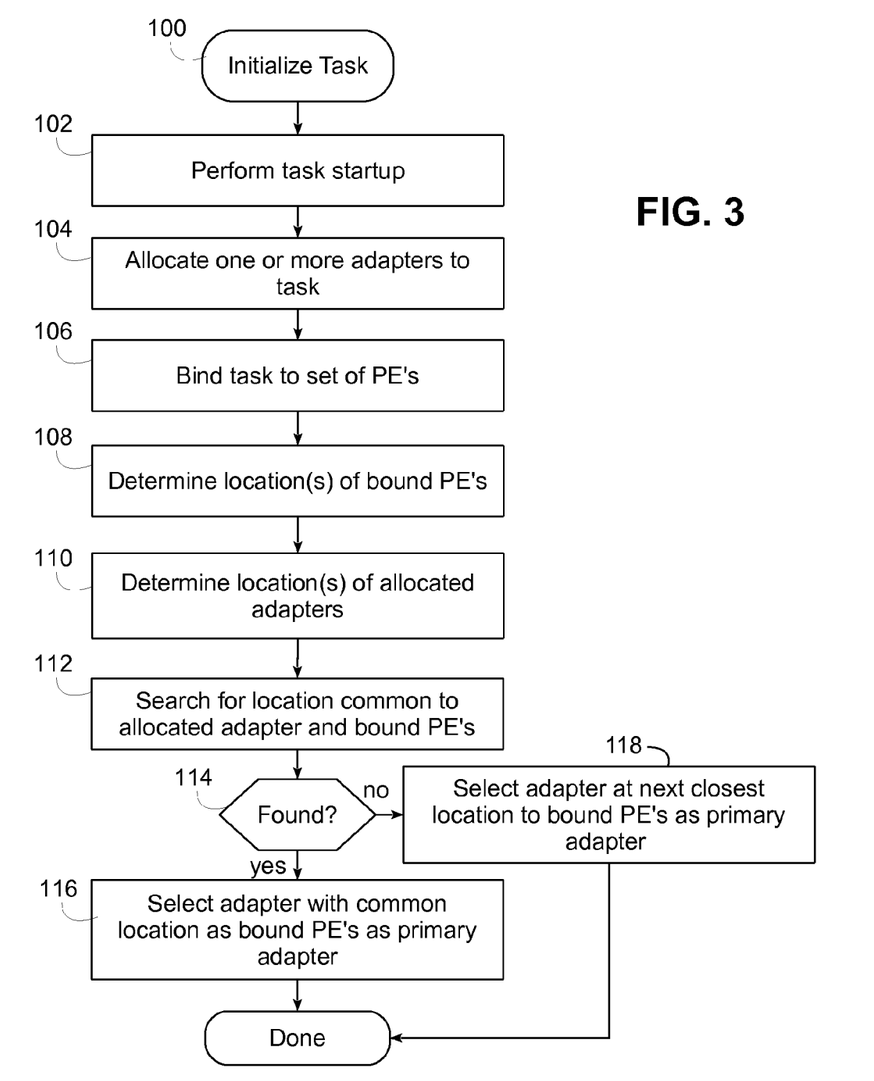
FIG. 3 is a flowchart illustrating an example sequence of operations for initializing a task in the HPC environment of FIG. 1.

FIG. 3 next illustrates a routine 100 for initializing a task in the HPC environment of FIG. 1. A task may be initialized, for example, in connection with initiating a parallel job in the HPC environment, whereby one or more tasks are instantiated throughout the HPC environment on behalf of the job.

In some embodiments, for example, a communication stack, e.g., the IBM parallel communication stack available from International Business Machines Corporation, may be configured to select one or more adapters for a task in connection with initialization of the task. As shown in FIG. 3, for example, startup of a task may be performed (block 102), performing various task startup operations that will be apparent to one of ordinary skill in the art having the benefit of the instant disclosure. As illustrated in blocks 104 and 106, as a component of such startup, the task is generally allocated one or more adapters, and the task is scheduled (bound) to a certain set of PE's (i.e., one or more PE's), which may, in the illustrated embodiment, include one or more hardware threads of execution, one or more processing core or cores, and/or one or more processors on a certain MCM or MCM's.

Next, in block 108, the location(s) of the bound PE's are determined, e.g., using a query to a communications library supported by the parallel communication stack. In this embodiment, the location refers to the MCM upon which a particular PE resides, although in other embodiments the location may be defined at a different level in the hierarchy of distributed computing components.

Next, in block 110, the location(s) of the allocated adapters are determined. As noted above, however, in some HPC environments, e.g., HPC environments where preconfigured adapter affinity information is unsupported, these locations generally cannot be ascertained via retrieval of preconfigured location data from a communications library. Thus, as will be explained in greater detail below, the location(s) of the allocated adapters may be determined using an empirical approach.

Next, in block 112, the communications library searches, e.g., by comparing the locations for the bound processing elements and the allocated adapters, for a location that is common to both an allocated adapter and a bound processing element. If such a location is found, block 114 passes control to block 116 to select an allocated adapter at the common location as the primary adapter for the task to send/receive data. If such a location is not found, however, block 114 passes control to block 118 to select another allocated adapter, e.g., at a next closest location to a bound processing element, as the primary adapter. Upon completion of block 116 or block 118, routine 100 is complete. Routine 100 therefore provides adapter affinity information to a parallel task and generally improves performance in the HPC environment of FIG. 1 by reducing the distance data will be moved from its buffer to its communication port and by using a faster integrated bus on the MCM.

It should be noted that the steps described in routine 100 may be automated programmatically, e.g., with scripting, or in the alternative, may incorporate some administrator involvement. A script may also generate some pattern for an environment variable that assists in identifying mappings more easily for HPC environments with more complex configurations such as 4 MCM's per node, 2 adapters per MCM, etc.

Now turning to the herein-described empirical approach, rather than using preconfigured adapter affinity information, speculative adapter affinity information, derived via empirical testing, is used in connection with adapter affinity performance. In some embodiments, an environment variable may be configured to speculate which IO adapter is connected to which MCM, such that a communications library may access the environment variable and select an IO adapter based on the setting. If a speculated mapping does provide a communication performance better than the others, then it may be assumed that the IO adapter is in fact plugged into a certain MCM. This speculative adapter affinity information may then be stored or saved and used as input for later jobs so that optimal performance using affinity may be achieved.

In the illustrated embodiment, for example, an environment variable, ADAPTER_MCM_MAP=n_0,n_1,n_2 . . . , may be used to define a physical mapping of which adapter is plugged into which MCM. For example, on an HPC system such as illustrated in FIG. 2, with two MCM's (MCM 0 and MCM 1), with two adapters (adapter 0 and adapter 1), each plugged into one of the MCM's, an assumption may be made as to which adapter is plugged into which MCM using this environment variable. For example, ADAPTER_MCM_MAP=0,1 may be used to specify that adapter 0 (adp_0) is on MCM 0 (mcm_0) and adapter 1 (adp_1) is on MCM 1 (mcm_1).

In some embodiments of the invention, for example, benchmark tests may be run using different mappings to obtain comparative performance results from which may be determined which, among the different mappings, yields optimum performance. From these comparative performance results, therefore, speculative locations may be determined for each adapter in an HPC environment. In some embodiments, processing element bindings are kept constant throughout benchmark testing so that tasks are executed on the same processing elements during each benchmark test so that comparable test results, e.g., bandwidth/latency performance, may be collected for each mapping. After the data is collected, the data may be analyzed (e.g., using a script), and a pattern generally emerges showing that a certain mapping produces the best bandwidth/latency performance, thereby empirically determining the likely locations of the adapters.

Figure 4:
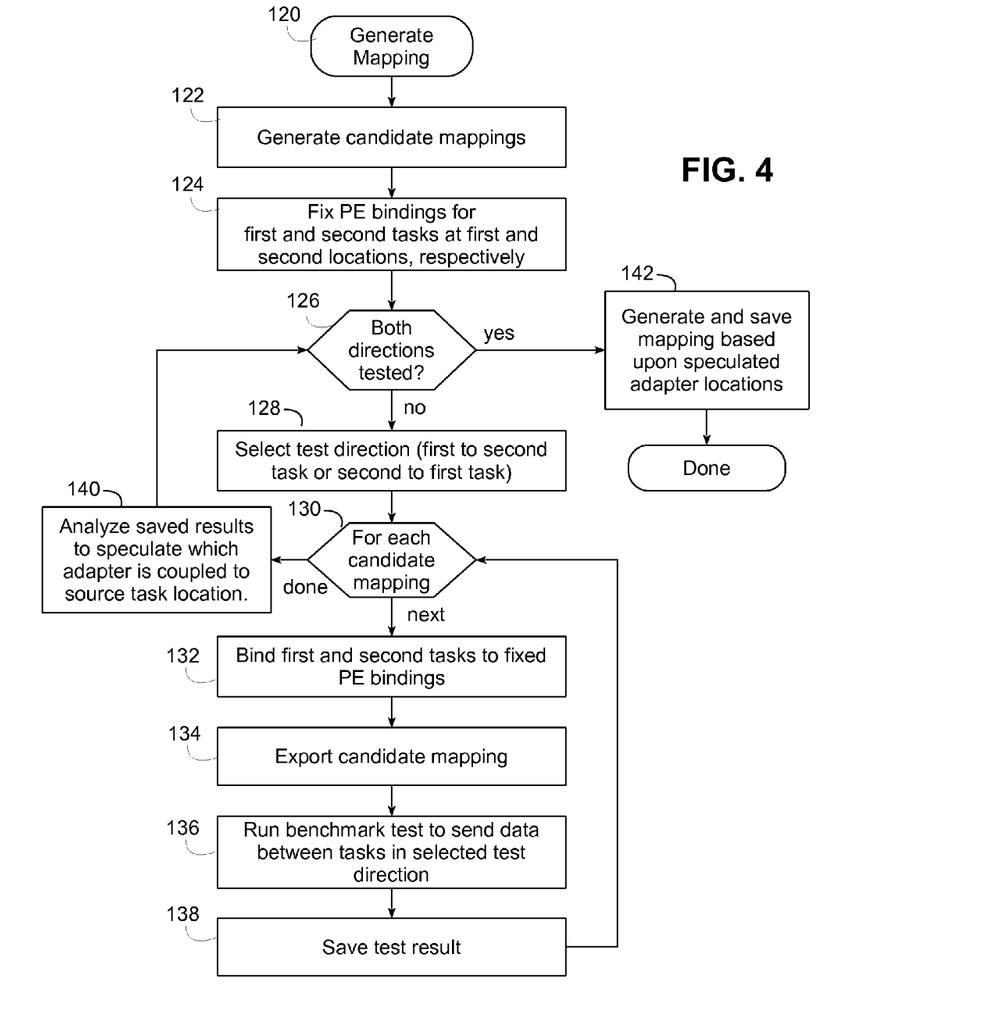
FIG. 4 is a flowchart illustrating an example sequence of operations for empirically generating a mapping in the HPC environment of FIG. 1.

Now turning to FIG. 4, an example generate mapping routine 120 is illustrated for empirically determining adapter affinity information for one or more adapters in a manner consistent with the invention. As shown in block 122, routine 120 may initially generate a plurality of candidate mappings (e.g., in the form of candidate environment variables as described above) representing potential mappings of various adapters to various locations. For the purposes of simplifying the explanation, an HPC system similar to that illustrated in FIG. 2, with two adapters (adapter 0 and adapter 1) and two locations represented by MCM 0 and MCM 1, will be assumed to be the environment in which routine 120 is executed, although it will be appreciated that routine 120 is not limited to use in such an environment. Thus, for example, the candidate mappings may include, for example, adapter 0 mapped to MCM 0 and adapter 1 mapped to MCM 1, adapter 0 mapped to MCM 1 and adapter 1 mapped to MCM 0, both adapters mapped to MCM 0, and both adapters mapped to MCM 1.

For each candidate mapping, it is desirable to keep the binding of tasks to processing elements constant such that comparable test results may be obtained. Thus, as illustrated by block 124, processing element bindings are fixed for first and second tasks (tasks 0 and 1) such that the tasks will run on the same locations (e.g., MCM's) during each benchmark test.

Next, block 126 initiates a loop to compare the performance of different mappings in each of two directions: first, from task 0 to task 1, and second, from task 1 to task 0. For each direction, block 128 selects the appropriate test direction (e.g., from task 0 to task 1 or from task 1 to task 0). Next, block 130 initiates a FOR loop to test each candidate mapping.

For each such mapping, block 132 binds the first and second tasks (task 0 and task 1) to the fixed PE bindings (e.g., task 0 to MCM 0 and task 1 to MCM 1). Next, block 134 exports the candidate mapping to essentially activate the candidate mapping in the HPC environment. For example, one candidate mapping may be ADAPTER_MCM_MAP=0, 1, representing adapter 0 being plugged into MCM 0, and adapter 1 plugged into MCM 1.

Next, in block 136, a benchmark test is run to send data between the tasks in the selected test direction (e.g., from task 0 to task 1). For example, in a Power7-based HPC environment, a Parallel Active Message Interface (PAMI) library test may run through the affinity flow described above in connection with FIG. 3, read the input from the activated mapping and pick out an adapter as the affinity adapter (e.g., for the ADAPTER_MCM_MAP=0,1 mapping, the library may select adapter 0 as the affinity adapter for task 0 since MCM 0 is the common MCM for task 0's PE and adapter). In this environment, a benchmark test such as a lightweight bandwidth/latency test optimized for PAMI, or any other combination of suitable benchmark tests, may be used, and as a result of testing, bandwidth and latency performance from task 0 may be obtained. The result of the test is saved in block 138.

Control next returns to block 130 to repeat blocks 132-138 for the other candidate mappings, e.g., ADAPTER_MCM_MAP=1,0, 0,0 or 1,1. Using each candidate mapping, the PAMI library will pick out a different adapter as the affinity adapter for each task; however, the performance result will generally vary with each candidate mapping as the data transfer paths will be different for each mapping.

Once all candidate mappings have been tested, block 130 passes control to block 140 to analyze the saved results to speculate, based upon the comparative performance, into which MCM adapter 0 is plugged. Control then passes to block 126 to determine if both direction have been tested. After testing the first direction, therefore, block 126 passes control to block 128 to essentially repeat blocks 128-140 for the second test direction (where task 1 sends data to task 0).

Once both directions have been tested, block 126 passes control to block 142 to generate and save an optimal mapping based upon the speculated adapter locations so that tasks in future jobs can access and use the optimal mapping in the affinity flow corresponding to FIG. 3, as described above.

Thus, for example, in the HPC environment illustrated in FIG. 2, execution of the generate mapping routine of FIG. 4, with task 0 executing in MCM 0 and task 1 executing in MCM 1, would generally speculate that adapter 0 is plugged into MCM 0 and adapter 1 is plugged into MCM 1. Consequently, during the task initialization of FIG. 3, for a task bound to a processing element on MCM 0, adapter 0 would generally be selected as the primary adapter for the task in block 116 based upon a speculated location of adapter 0 on MCM 0, as determined in block 110.

It will be appreciated that routine 120 may be adapted to determine speculative adapter affinity information for various types of HPC environments, e.g., where locations are defined at levels other than at the MCM level, where multiple IO adapters may be coupled to a particular location, where other factors impact the relative performance of an IO adapter based upon its location, where more than two tasks at more than two locations are tested, for other types of IO adapters, etc. In addition, routine 120 may perform alternate and/or additional performance tests for each candidate mapping in other embodiments. Routine 120 may also be implemented in a number of manners consistent with the invention, e.g., as one or more scripts, within a library or other software component, as purely automated operation, as a semi-automated operation incorporating user input, or in other manners that will be apparent to one of ordinary skill in the art having the benefit of the instant disclosure.

Various modifications may be to the illustrated embodiments consistent with the invention. Therefore, the invention lies in the claims hereinafter appended.

The invention claimed is:

1. A method of determining adapter affinity in a high performance computing (HPC) environment of the type including a plurality of distributed computing components defining a plurality of locations and a plurality of input/output (IO) adapters, with each distributed computing component including at least one processing element, and with each IO adapter coupled to a distributed computing component among the plurality of distributed computing components, the method comprising:
for each of a plurality of candidate mappings that speculatively map at least one IO adapter to at least one location among the plurality of locations, running a performance test for a task executed by a processing element in a distributed computing component at a first location among the plurality of locations, wherein the plurality of candidate mappings includes first and second candidate mappings, wherein the first candidate mapping maps a first IO adapter among the plurality of IO adapters to the first location, and the second candidate mapping maps a second IO adapter among the plurality of IO adapters to the first location, and wherein running the performance test respectively generates first and second test results for the first and second candidate mappings; and
generating speculative adapter affinity information that assigns at least one IO adapter to at least one location among the plurality of locations based upon the performance test run for each of the plurality of candidate mappings, including assigning the first IO adapter to the first location based upon a comparison of the first and second test results for the first and second candidate mappings.

2. The method of claim 1, wherein the HPC environment is of a type where preconfigured adapter affinity information is unsupported.

3. The method of claim 1, wherein the task is a first task, the method further comprising:
storing the speculative adapter affinity information; and
during initialization of a second task to which is allocated the first IO adapter:
binding the second task to at least one processing element in the distributed computing component at the first location;
determining that the at least one processing element is at the first location;
determining that the first IO adapter is assigned to the first location based upon the stored speculative adapter affinity information; and
selecting the first IO adapter as a primary adapter for the second task based upon determining that the first location is common to the at least one processing element and the first IO adapter.

4. The method of claim 1, wherein the plurality of distributed computing components includes a plurality of multi-chip modules (MCM's), wherein each IO adapter is coupled to an MCM among the plurality of MCM's, and wherein assigning the first IO adapter to the first location indicates that the first IO adapter is coupled to a first MCM associated with the first location.

5. The method of claim 1, wherein the task is a first task, the distributed computing component is a first distributed computing component and the processing element is a first processing element, wherein running the performance test for the first task includes communicating data from the first task to a second task executed by a second processing element in a second distributed computing component at a second location among the plurality of locations, wherein the first candidate mapping maps the second IO adapter to the second location, and the second candidate mapping maps the first IO adapter to the second location.

6. The method of claim 5, further comprising, for each of the plurality of candidate mappings, running a performance test for the second task by communicating data from the second task to the first task using each of the first and second candidate mappings.

7. The method of claim 6, wherein generating the speculative adapter affinity information assigns the second TO adapter to the second location based upon a comparison of test results generated from the performance test for the second task.

8. The method of claim 6, further comprising fixing processing element bindings for the first and second tasks such that the performance test performed for each candidate mapping and for each of the first and second tasks is performed using fixed processing element bindings.

9. The method of claim 1, wherein the plurality of locations correspond to physical locations of hardware components in the HPC environment.

10. The method of claim 1, wherein the plurality of distributed computing components includes a plurality of multi-chip modules (MCM's), and wherein each of the plurality of locations corresponds to a respective MCM among the plurality of MCM's.

11. The method of claim 1, wherein each distributed computing component includes at least one slot such that any IO adapter plugged into the at least one slot of a particular distributed computing component is located at the location of the particular distributed computing component.

* * * * *